United States Patent
Sebbane

(10) Patent No.: US 7,464,074 B2
(45) Date of Patent: Dec. 9, 2008

(54) METHOD AND SYSTEM FOR USING QUERY INFORMATION TO ENHANCE CATERGORIZATION AND NAVIGATION WITHIN THE WHOLE KNOWLEDGE BASE

(76) Inventor: Danny Sebbane, Trumpeldor 37 St., Tel Aviv 63425 (IL)

( * ) Notice: Subject to any disclaimer, the term of this patent is extended or adjusted under 35 U.S.C. 154(b) by 0 days.

(21) Appl. No.: 10/535,665

(22) PCT Filed: Nov. 10, 2003

(86) PCT No.: PCT/IL03/00938

§ 371 (c)(1), (2), (4) Date: May 11, 2005

(87) PCT Pub. No.: WO2004/044896

PCT Pub. Date: May 27, 2004

(65) Prior Publication Data

US 2006/0053142 A1    Mar. 9, 2006

Related U.S. Application Data

(60) Provisional application No. 60/425,728, filed on Nov. 13, 2002.

(51) Int. Cl.
G06F 7/30 (2006.01)
G06F 7/00 (2006.01)

(52) U.S. Cl. .............................................. 707/3; 707/2
(58) Field of Classification Search ..................... 707/3, 707/2, 200, 100; 705/14
See application file for complete search history.

(56) References Cited

U.S. PATENT DOCUMENTS

| | | | |
|---|---|---|---|
| 6,701,318 B2 | 3/2004 | Fox et al. | |
| 7,181,438 B1* | 2/2007 | Szabo | ............................ 707/2 |
| 2004/0024790 A1* | 2/2004 | Everett | ......................... 707/200 |
| 2004/0078363 A1 | 4/2004 | Kawatani | |
| 2004/0083211 A1 | 4/2004 | Bradford | |
| 2004/0093328 A1 | 5/2004 | Damle | |

* cited by examiner

*Primary Examiner*—Charles Rones
*Assistant Examiner*—Fariborz Khoshnoodi

(57) ABSTRACT

A method is disclosed to create some structure from the knowledge base of an organization, the knowledge base including a document database (DB) and queries submitted by users concerning the documents, wherein the method performs monitoring and clustering to enable analysis of the ideas of the organization. The first step of the method involves users submitting queries by entries on a graphical user interface (GUTI). Subsequent steps include recording the queries of the organization, which includes saving submitter and organization information, comparing queries using a weight matrix generated by a distance function and clustering of the queries into a semantic structure.

11 Claims, 9 Drawing Sheets

Fig. 2

InsightLook Environment

Application  DataImports  DataAnalysis  QueriesAnalysis  Search  Admin

Document pointed by the query

| Title | Hit Ratio | Source Query |
|---|---|---|
| 9_Women & AIDS.txt | | [aids],[prevention],[wom |
| 4_Behaviour_change.txt | | [aids],[prevention],[wom |
| 23_costs.txt | | [aids],[prevention],[wom |
| 104_Better_Cost_Benefit | | [aids],[prevention],[wom |
| 106_How_Risk_Populatio | | [aids],[prevention],[wom |

← 410   ← 420

Document Sources

| Title | Hit Ratio | Source Query |
|---|---|---|
| 9_Women & AIDS.txt | | [aids],[prevention],[wom |

Document Abstract

[9] Women & AIDS
A REPRINT FROM FDA CONSUMER MAGAZINE

[Show Document] ← 430    [Related Queries]

9_Women_AIDS.txt - Notepad

[9] Women & AIDS
A REPRINT FROM FDA CONSUMER MAGAZINE
Printed November 1993

This article originaly appeared in the October 1993 FDA Consumer.

By Marian Segal.

Infections with HIV, the virus that causes AIDS, are rising nearly 4 times as fast in women as in men.

InsightLook Environment – [Text connections]

Application　DataImports　DataAnalysis　QueriesAnalysis　Search　Admin

Clusters 1. homosexual, aids
2. cost ← 712
4. bartonella, aids

710

Employees in selected cluster
Name: Dr. Zamir
Mail Address: Zamir@MLI.com
Job Title: Analyst
Phone Number: 551212

☐ The cost per patient typically ranges from.......many people without adequate insurance

☐ Unfortunately, a disproportionate number of people with HIV are poor or lack insurance thus increasing...

☐ According to the NEJM editorial, Medicaid is the largest health insurance program...

☐ Not surprisingly, the RUND study showed that drug costs were higher among underserved groups, including... and patients without private insurance.

☐ While many insurance carriers pays for these tests, many Medicaid programs do not...

[Show Document]

⊟---aids
　　├---patient, available
　　├---states, limited, some, others
　　├---researchers, 1996, average, 1998
　　├---Insurance, doctors
　　└---disease, survival, progression, improved, welcome, response

Text connections
Pressing OK will refresh all data presented in this form
[OK] [Cancel]

InsightLook Environment -- [Text connections]

Application  DataImports  DataAnalysis  QueriesAnalysis  Search  Admin

Clusters 1. aids, bartonella
2. aids
3. cost
4. kaletra
5. treatment, retrovirus
6. cryptosporidiosis
7. hiv

→ 810

Employees in selected cluster
Name: Mr. Yen
Mail Address: Yen@MLI.com
Job Title: Acountent
Phone Number: 5554041

☐ While many insurance carriers pays for these tests, many Medicaid programs do not... — 835

☐ ADAP is administered individually.... The lack of adequate insurance coverage — 835

☐ The cost per patient typically ranges from $10000 to $15000 a year in the United States. — 835

☐ Unfortunately, a disproportinate number of people with HIV are poor or lack insurance thus increasing... — 835

⊟ costs
    cost
    doctors
    Insurance — 823
    study

→ 820

→ 830

Text connections
Pressing OK will refresh all data presented in this form

[OK]  [Cancel]

[Show Document]

Fig. 8

InsightLook Environment – [Text connections]

Application  DataImports  DataAnalysis  QueriesAnalysis  Search  Admin

Clusters 1. aids, bartonella
2. aids
3. cost
4. kaletra
5. treatment, retrovirus
6. cryptosporidiosis
7. hiv Employees in selected cluster
Name [Mr. Yen]
Mail Address [Yen@MLI.com]
Job Title [Acountent]
Phone Number [5554041]

☐ ---cost, insurance
  ├---cd4, indinavir, protease
  ├---studies, are
  ├---patient, people, prices, available, jeff, expand, nations, dr ←910
  └---hiv ←914

☐ These analysis show that there is a strong economic, as well as clinical... for HIV infection. ←920

☐ Belter Cost-B found for AIDS treatments... a pair of studies led to...for the cost... against HIV and drug resistance... ←920

☐ Milton Weinstein co-authored... of HIV treatment... ←920

☐ Freedberg and coworkers developed a comprehensive... of HIV disease, allowing the... ←920

[Show Document]

Fig. 9

METHOD AND SYSTEM FOR USING QUERY INFORMATION TO ENHANCE CATERGORIZATION AND NAVIGATION WITHIN THE WHOLE KNOWLEDGE BASE

This application is the National Stage of International Application No. PCT/IL2003/000938, filed Nov. 10, 2003, which claims the benefit under 35 U.S.C. 119(a-e) of U.S. Provisional Application 60/425,728 filed Nov. 13, 2002, which is herein incorporated by reference.

FIELD OF THE INVENTION

The present invention relates to methods for creating and exploiting a knowledge base. More particularly, the present invention relates to methods and systems for using query information to enhance categorization and navigation within the whole knowledge base.

REFERENCES

Ben-Hur, Horn, Seigelman and Vapnik, 2001. Support Vector Clustering. *Journal of Machine learning Research*, 2:125-137;

Mika, Scholkopf, Smola, Muller, Scholt and Ratsch, 1999. Kernel PCA and Denoising in Feature Spaces. *Adavances in Neural Information Processing Systems* 11;

Scholkpof and Smola, 2001. *Learning with Kernels*. MIT Press;

Slonim and Tishby, 2000. Document Clustering Using Word Clusters via the Information Bottleneck Method. *Research and Development in Information Retrieval (SIGIR)*, pp. 208-215. ACM press, NY; and Tishby, Pereira and Bialek, 1999. The Information Bottleneck Method. *Proceedings of the 37th Allerton Conference on Communication and Computation.*

BACKGROUND OF THE INVENTION

The invention is pertinent to the creation and exploitation of knowledge from an accumulation of unstructured information storage. It provides grounds for relating bodies of knowledge, stored or implied in warehouses, incorporates the expertise of users and generates maps or metadata describing or representing information or knowledge.

The goal of many applications is to gain useful information from unstructured data.

The general phases of such a process would be:
accumulating information, as relevant as possible;
organizations information in warehouses for later retrieval processing;
data mining, aimed to uncover hidden phenomena and knowledge;
searching and retrieving data, using query and visualization technologies;
mapping areas of interest regarding experts and information; and
delivering and monitoring the flow of 'on-line' information for all demands.

Data Mining:

Data mining may be defined as the process of discovery of non-obvious valuable patterns, from a collection of data, or alternatively, the automated extraction of hidden predictive information from databases.

Data mining uses a variety of approaches. Data mining software allows users to analyze large databases to solve business decision problems. Data mining is, generally, the convergence and use of artificial intelligence methods and machine learning techniques. In most standard database operations, nearly all of the results presented to the user are something that they knew existed in the database already. Data mining, on the other hand, extracts information that the user did not know existed.

Data mining is generally used to point out interesting information in an accumulation of information. Once such phenomena are discovered, the next challenge is to allow consumers to make use of the new knowledge and insights discovered.

Organization

Organization of information has to support the following criteria:
have the information ready for future retrieval;
have the information ready for future reorganization; and
allow coherent display and visualization of information and metadata of information.

Retrieval

Retrieval is the process by which searching techniques provide results, which are later used to rank and visualize the requested data. Retrieval is usually done by posing queries to an information domain by a user.

Clustering

Knowledge discovery in databases often requires clustering the data into a number of distinct segments or groups in an effective and efficient manner. Clustering is the technique of grouping records together based on their locality and connectivity within an n-dimensional space. Good clusters show high similarity within a group and low similarity between any two different groups.

Clustering Queries

There are existing solutions that monitor the stream of queries and make use of information contained. These typically concern query enhancement for the purpose of better information retrieval. Natural language processing (NLP) terms such as query expansion, query matching, query understanding and semantic enhancement are often used to describe different methodologies whose net goal is the same: providing better and more relevant retrieval to answer the original query of the user, based on information extracted from the stream of past queries. Prior art query solutions generally rely on simple statistical approaches, such as how often various words or phrases appear together in the same document, and cluster words together into semantic "families."

Most Prior art data mapping techniques lead to "rule books," which are created and maintained in order to map experts to knowledge. Due to the nature of such techniques, "rule books" are static and are seldomely updated.

Visualization

Wherever there are processes that convert, process, represent or reduce large amount of information, there is a need to represent that raw or processed information to human users, in order to allow them to understand, monitor or analyze the operation and results of those processes. Many Data Mining applications were extremely efficient in processing information, but are quite poor in visualizing their results to human consumers and controllers in a usable manner. The challenge is even greater when it comes to designing visualization models that allow the relation of the operation of Data Mining and other technologies to the daily activities and needs of the operating organizations.

Mapping

There is a need to map areas of interest of organizations to regarding information and people. Most Prior art data-mapping techniques rely on the creation and maintenance of "rule books," which are created and maintained in order to map experts vs. knowledge. Due to the nature of such techniques, rulebooks are static and are seldom updated.

Therefore, there is a need for a method that overcomes the limitations of the prior art, and provides dynamic adaptive mapping of the areas of interest to the users within an organization, i.e., information derived from unstructured databases, that reflects changes in the interests of the organization.

SUMMARY OF THE INVENTION

Accordingly, it is a principal object of the present invention to deliver—a unique weighting method to compare user queries and clusters of queries.

It is another object of the present invention to make use of data contained within the stream of user queries, as being representative of what an organization's interests are over the specific archived time interval, and attempt to arrange the information that was brought into the organization according to those queries It is one more object of the present invention to keep a record of the queries initiators, and to record and weight their contribution to each of the clusters, thus creating a map of the actual distribution of knowledge in the organization ("Actual Map").

It is another object of this invention to correlate the Actual Map to a formal organizational chart, allowing a comparison and analysis of both maps.

It is one more object of the present invention to arrange the unstructured data (texts) according to the structure of the clusters generated from the user's queries.

It is a further object of the present invention to develop an information management and retrieval (IMR) system that monitors, records user queries and clusters them in a unique methodology.

It is one further object of the present invention to accumulate queries in groups according to this weighting method, and to divide the groups according to semantic and linguistic considerations.

It is yet another object of the present invention to provide core algorithms, combined with contemporary machine-learning techniques having modifications that adapt them to a two-tier architecture thereby; Queries Vs. Documents manipulations.

A method is disclosed to create some structure from the knowledge base of an organization, the knowledge base including a document database (DB) and queries submitted by users concerning the documents, wherein the method performs monitoring and clustering to enable analysis of the ideas of the organization. In the firststep of the method users submit queries by entries on a graphical user interface (GUI). Additional steps include recording the queries of the organization, which comprises saving submitter and organization information, comparing queries using a weight matrix generated by a distance function and clustering of the queries into a semantic structure.

The processing steps and sub-steps for the method and system of the present invention are:
1. Monitoring and clustering queries:
   a. User interface for submitting queries;
   b. Saving queries in a unique structure, i.e., saving submitter and organization information;
   c. Comparison between queries using a weight matrix generated by an algorithm regarded as a distance function; and
   d. Clustering queries into semantical structure using a clustering algorithm;
2. Gathering data for the organization from "out sources" and entering it in the organization database:
   a. Gathering data into the organization DB;
   b. Generating a vector structure of the data appearances; and
   c. Using the vector structure in order to form semantic familiarities (clustering words, i.e., "connections");
3. Queries enhancement for preprocessing data (Indexing via Brown corpus):
   a. Enhancing words appearing in queries by multiplying the number of appearances with a constant;
   b. Primary data analysis—comparing the distribution of a word within the organization DB and its distribution in Natural Language (NL); and
   c. Weighting words appearances with respect to NL;
4. Clustering Data:
   a. Using information theories in order to assemble and represent the data (Information Bottleneck);
   b. Using queries as prior knowledge for the Information Bottleneck;
   c. Clustering data (Agglomerative, Sequential Clustering, 2002); and
   d. Using queries as a predisposed factor, thereby replacing the random factor when performing clustering;
5. Using queries' data for searching information (search engine):
   a. Methods for searching information using queries' structure (clusters); and
   b. Presenting queries' structure with respect to a new query (when a user presents a new query, the system rates the nearest clusters according to the new query); and
   c. presenting submitted queries in order to facilitate the submission of a new query; and
6. Using the queries structure to create an organization map:
   a. develop a method that facilitates the designation of experts concerning the requested data; and
   b. provide a unique graphical organization map of data occurrences and experts.

The present invention is based on a smart analysis of the ongoing stream of queries generated by organization users. This source of dynamic, up-to-date information is used to generate and continuously update an information management and retrieval (IMR) system, which serves the changing information management needs of the organization. At the foundation of this technology lies an interleaved information processing approach, wherein two techniques are combined.

Structured categorization of the organization's stream of queries is used to generate an interacting, dual map representation of the organizational knowledge. The two tiers in this representation are the Query Map and the Document Map, representing complementary and inter-related aspects of the organization's knowledge base. The Query Map assigns primary and secondary terms for user queries into the document database, and the Document Map does so for the document database itself. Structures revealed by the Query Map are used to refine the Document Map, which is, in turn, used to update and restructure the Query Map. Ways have been found to build upon this two-tier representation and categorization concept in order to generate veritable information processing functions, such as adaptive categorization, query expansion and enhanced semantic capabilities.

The present invention can be differentiated from other systems that monitor the query stream at two levels:

While the present invention performs query enhancement, it's use of information contained within the queries extends beyond information retrieval applications. Information gained from the queries can be used to enhance categorization and navigation within the whole knowledge base of the organization.

The present invention delivers a refined version of query enhancement, by drawing upon semantic metrics that are built specifically to reflect the organization's knowledge structure. Using both the Query Map and the Document Map, precise expansions can be obtained. Such expansions correspond to the terms which are most relevant in the context of interests within the organization, rather than in the wider and less precise context of generic natural language corpora.

The present invention is based on algorithms for construction of a proximity measure between structured queries. A proximity measure is defined for queries that reflects the relative importance of different query terms. This proximity measure allows treatment of both structured and unstructured types of queries in a unified framework. This proximity measure allows effective hierarchical categorization, resulting in the structure of the Query Map. The Document Map is created by applying an *Information Bottleneck* method [Tishby, Pereira and Bialek, 1999; Slonim and Tishby 2000] to the document database.

Hypergraphs have been previously used for (a single) high-dimensional clustering, but not for combining multiple groupings. Mutual information is a useful measure in a variety of contexts. For example, the information bottleneck method is an information-theoretical approach that uses mutual information to do dimensionality reduction (e.g., through clustering), while trying to preserve as much information about the class labels as possible.

The Information Bottleneck Method is a link between information theory, statistical mechanics and learning. A fundamental problem in learning and data analysis is the extraction of "relevant" representations, or reduced description of random variables, where the relevance is determined via other known variables. This very general problem can be formulated using information theory ideas, in a way that yields specific algorithms for solving this problem. Given any two non-independent random variables, it is proposed to compress one of the variables under a constraint on the mutual information to the other one. This general variational problem yields an exact formal solution which can be explicitly obtained via several converging procedures. It also provides a general and rich, unified framework for discussing many problems in signal processing, pattern recognition and machine learning.

Two novel ideas are applied in the creation of the Document Map. First, information from the Query Map is incorporated into the bottleneck processing, yielding a more focused clustering that matches the knowledge areas reflected by the queries. In addition, a novel method was developed for the iterative step of the algorithm. This method replaces the standard agglomerative technique with a combination of hierarchical splitting and modified K-means clustering. It bears promise for a significant reduction of computational time complexity. Optionally, further utilization of the interplay between the Documents and Queries maps can be made by closing the loop, and using the document map to enhance the query map: Document similarities will be used to derive organization-specific Term similarities, which in turn will effect the Query Map. This will be performed using efficient iterative algorithms such as Expectation-Maximization.

Of particular promise is the fact that the basic approach lends itself to extension in a very interesting direction. The proximity measure for queries described above can be regarded as a kernel function specifically tailored to the characteristics of structured queries. This opens the possibility for using state-of-the-art kernel-based methods [Scholkopf and Smola, 2001] such as Kernel PCA [Mika et al., 1999] and Support Vector Clustering [Ben-Hur et al., 2001]. Such methods have been rapidly gaining popularity in several core areas of machine learning, such as bioinformatics and document retrieval. In the context of query processing and information management, their application seems to have been somewhat delayed due to lack of appropriate kernel functions.

Additional features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which:

FIG. 2 is screenshot illustration of cluster specification, constructed in accordance with the principles of the present invention;

FIG. 4 is screenshot illustration of a document evaluation screen, constructed in accordance with the principles of the present invention;

FIG. 7 is screenshot illustration of a text connections evaluation screen, constructed in accordance with the principles of the present invention;

FIG. 8 is screenshot illustration of a text connections update screen, constructed in accordance with the principles of the present invention; and FIG. 9 is screenshot illustration of a text connections interactive screen, constructed in accordance with the principles of the present invention.

DETAILED DESCRIPTION OF THE INVENTION

Figure 1:
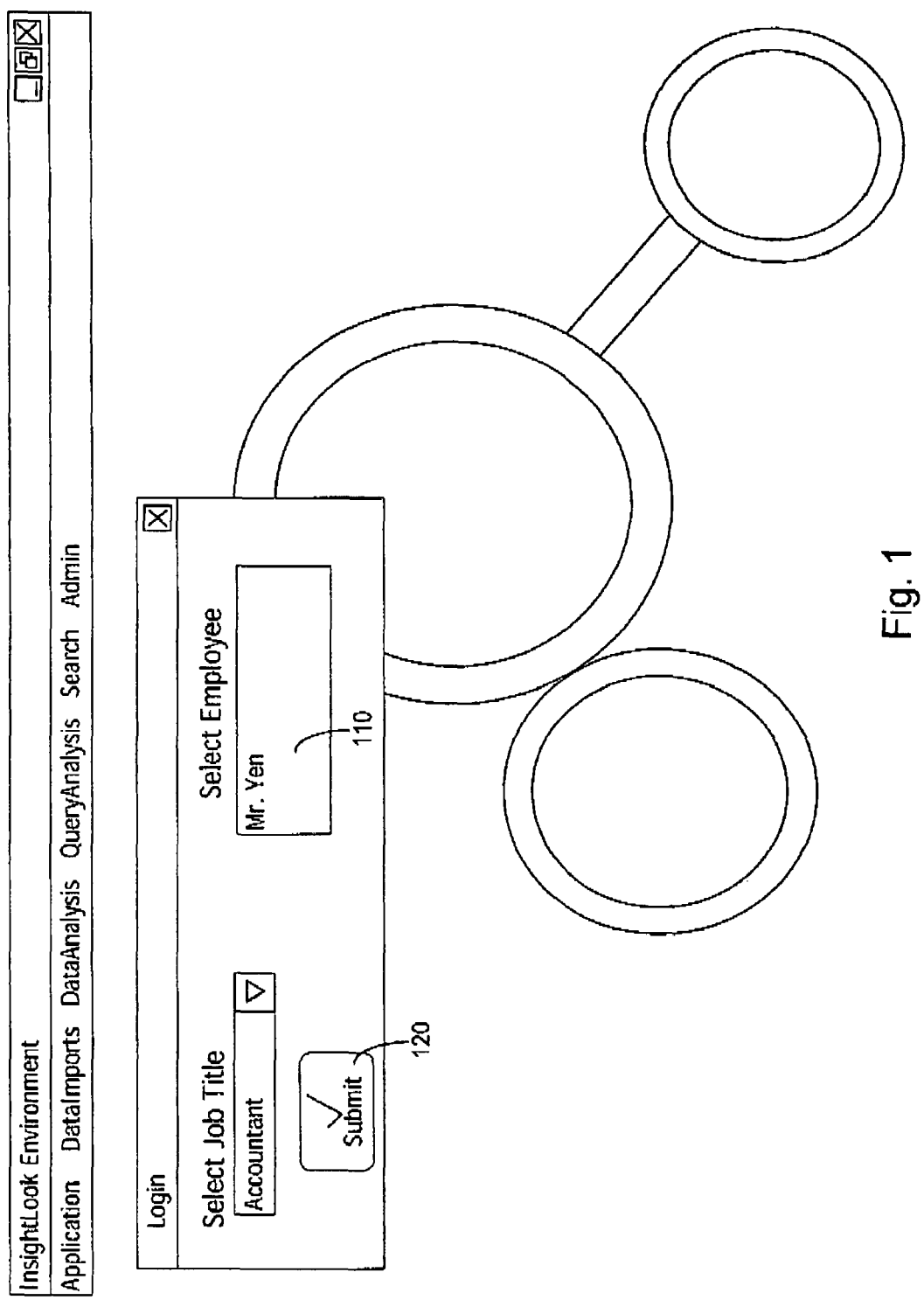
FIG. 1 is screenshot illustration of a login screen, where the employee/user enters his job title, constructed in accordance with the principles of the present invention.

1. Monitoring and Clustering Queries:

a. A unique user interface for submitting queries: The first step in the method of the present invention is the development of a user interface used to submit user's queries in a unique six levels hierarchical structure.. The hierarchy embodied in the query structure is used to: (1) cluster queries, forming semantical familiarities; (2) enhance and improve searching capabilities. In a preferred embodiment, a graphical user interface is used to present 6 levels, as exemplified in the screenshot of FIG. 3 below;

b. Saving queries in a unique structure, i.e., the submitter and organization information are recorded: When submitting a query a list of associated information to the query is stored in the database as well. Information that is used later on to monitor the distribution of information in the organization;

c. Comparison between queries, using a weight matrix generated by an algorithm as a distance function: This algorithm provides a weight matrix, and out of this weight matrix a distance function is determined between each query and every other query. E.g., Table I illustrates a comparison between queries [$Q_n$], while Table II illustrates the matrix:

TABLE I $Q_1$ is Query 1:
    Primary Subject      a
    Secondary-subject      b
    Primary Actor      c
    Secondary Actor      d
    Place      e
    Time      f $Q_2$ is Query 2:
    Primary Subject      g
    Secondary-subject      h
    Primary Actor      a
    Secondary Actor      d
    Place      f
    Time      i $Q_3$ is Query 3:
    Primary Subject      w
    Secondary-subject      b
    Primary Actor      c
    Secondary Actor      d
    Place      e
    Time      f The 6 levels of the preferred embodiment comprise a top-down hierarchy, wherein the $1^{st}$ level is greater than the $2^{nd}$ level, the $2^{nd}$ level is greater than the $3^{rd}$ level, etc. A detailed array of values implimenting this hierachical structure can be seen in Table II. The matrix presented in Table II is used to compare queries.

TABLE II

|  | Level 1 | Level 2 | Level 3 | Level 4 | Level 5 | Level 6 |
| --- | --- | --- | --- | --- | --- | --- |
| Level 1 | 0.6019 | 0.5116 | 0.4213 | 0.3309 | 0.2406 | 0.1503 |
| Level 2 | 0.5116 | 0.0599 | 0.0489 | 0.0379 | 0.0269 | 0.1503 |
| Level 3 | 0.4213 | 0.0489 | 0.0049 | 0.0046 | 0.0043 | 0.0041 |
| Level 4 | 0.3309 | 0.0379 | 0.0046 | 0.0038 | 0.0036 | 0.0033 |
| Level 5 | 0.2406 | 0.0269 | 0.0043 | 0.0036 | 0.0031 | 0.0028 |
| Level 6 | 0.1503 | 0.0159 | 0.0041 | 0.0033 | 0.0028 | 0.0026 |

Table III shows a comparison between three queries $Q_1$, $Q_2$ and $Q_3$:

TABLE III

| $Q_3$ | $Q_1$ | $Q_2$ |
| --- | --- | --- |
| w | a | g |
| b.........0.0599.........b    0.4213 | | h |
| c.........0.0049.........c | | a |
| d.........0.0058   ...d.........0.0038 | | d |
| e.........0.0031.........e | | f |
| | 0.0028 | |
| f.........0.0026.........f | | i |
| 0.0763....................0.4279 | | |

Thus, since 0.4279 is greater than 0.0763, $Q_3$ is closer to $Q_1$ than to $Q_2$; and d. Clustering queries into semantical structure using a clustering algorithm: The distance function is used to cluster the queries. The end result is numerous clusters, or "families" of queries, that have semantic connections and "distances" between them defined by their differences and weights. The distance between queries is used to organize the queries into appropriate clusters. Although a known agglomerative algorithm is used for the clustering, the distance function provides a novel feature. Thus, the present invention uses an agglomerative algorithm to cluster queries and create families of queries, by using a weighted matrix as a distance function to create the clusters of queries. I.e., sub-step 1-d uses the results of sub-step 1-c to create clusters of queries.

Furthermore, when a user presents a new query, the system rates the nearest clusters according to the new query. New queries can be evaluated in real-time, or periodically, to see how close each is, and whether to add it to an existing cluster, or optionally either enlarge the cluster boundary or form a separate "satellite" cluster. Alternatively, if no cluster is "close," a distant new cluster may be formed to accommodate a new query, and the cluster "map" is regenerated;

2. Gathering Data for the Organization and Storing it in the Organization Database (DB):

a. Gathering data into the organization DB. The system detects the information demands of the organization and stors the information in the DB;

b. Generating a vector structure of the data: The system represents each word as a vector of how the word is distributed in the the queries of the organization and the document database of the organization, i.e., the documents and phrases in which it appears, etc. The goal is to create clusters of words that are semantically related to each other, as described in step 4 below. Queries are associated with phrases (or sentences) and clusters are associated with documents. Thus, words that appear in queries have an added component relative to those that only appear in documents. A word that appears in documents only has a 2-dimensional vector: documents; and phrases. A word that also appears in queries has a 4-dimensioal vector: documents; phrases; clusters; and queries. A vector is used to represent the distribution of the word in the organizational database and organizational queries. If a word appears in a query, it is manifested by the third step, wherein it is automatically multiplied by a constant. Thus, the vector represents multiple instances of the word. E.g., word a appeared in document 1/phrase 1, document 1/phrase 2, and in document 2/phrase 2 it appeared twice. Words which also appear in at least one query are shown below in bold:

Words appearing in Doc 1
    a b c d q • e a g h q •
Words appearing in Doc 2
    i j b l • m a a p •

Furthermore, the following represents the distribution of words in queries and clusters of queries as determined by the system (described in step 1). The system has decided that queries $Q_1$, $Q_2$ and $Q_3$ should be clustered in $C_1$ and queries $Q_4$ and $Q_5$, having no words from either $D_1$ or $D_2$, should be clustered in $C_1$. Semantic categorizations using the queries' structure are shown in Table IV, as follows, for two clusters of queries:

TABLE IV

| $C_1$ | | | $C_2$ | |
| --- | --- | --- | --- | --- |
| $Q_1$ | $Q_2$ | $Q_3$ | $Q_4$ | $Q_5$ |
| q | s | q | g | g |
| r | b | v | j | u |
| b | t | w | | u | such that the following, in Table V, represent vectors a ($V_a$), q ($V_q$) and b ($V_b$) have dimensions of document ($D_w$) and phrase ($Ph_x$) only, when there are no appearances in a query, and when there are query appearances, have added dimensions of cluster ($C_y$) and query ($Q_z$):

TABLE V

| | | | | | |
|---|---|---|---|---|---|
| $V_a \rightarrow$ | $D_1, Ph_1;$ | $D_1, Ph_2;$ $D_1, Ph_{2\times 2};$ | | | |
| $V_b \rightarrow$ | $D_1, Ph_1;$ | $D_1, Ph_2;$ | | $C_1, Q_1;$ | $C_1, Q_3;$ and |
| $V_c \rightarrow$ | $D_1, Ph_1;$ | $D_2, Ph_1;$ $D_2, Ph_2;$ | | $C_1, Q_1;$ | $C_1, Q_2$ |

$Ph_{2\times 2}$ indicates "a" appears twice in the second phrase of $D_2$.

3. Queries Enhancement for Preprocessing Data (Indexing via Brown corpus). The second step is enhancing the queries for pre-processing of the data, looking at whether words appear in documents and phrases as semantic units. The "distance" between words in a phrase is also considered. The basis of comparison for occurance of words is the Brown Corpus. The Brown Corpus is the distribution of English words in the natural language, as appears in a large sample of documents from diverse sources:

a. Enhancing words appearing in queries by multiplying the number of appearances with a constant. The word is measured for its frequency of occurance in the specific data of the organization. If a word, for example, "refrigerator," appears with 10 times the frequency in the data, this may be considered significant, and words are ranked accordingly. This measured value affects the weighting process described above.

The archive of queries is used to manipulate the data. For example, if words a, b, c and d appeared once in a document. If the word d also appeared a number of times in the queries, the number is multiplied by a constant, such as 4, although the value of the constant may be changed if this is found appropriate. Each word in the database (DB) that appeared also in queries is multiplied by this constant in order to manipulate its weight with respect to other words that did not appear;

b. Primary data analysis—comparing the distribution of a word within the organization DB and its distribution in Natural Language (NL): Thus, the Brown Corpus is used to give each word a weight relative to its frequency of occurrence in general usage; and c. Weighting words appearances with respect to NL;

4. Clustering Data:

a. Using information theories in order to assemble and represent data (Information Bottleneck);

b. Using queries as prior-knowledge for Information Bottleneck: When semantic categorization of words into semantic families is begun, the structure inherent in the clustering of the queries has an impact on how the words will cluster together as individual notions. For example, if 2 words appear in the same document and the same cluster, they stand more of a chance of clustering together than 2 words that appear only in the same document. Furthermore, if 2 words appear in the same query, they stand more of a chance of clustering together than 2 words that appear only in the same cluster. The structure revealed by the weighting in the first step, is entered into the vectors in this fourth step. Semantic categorization creates connections of vectors, and has to consider the structure of the queries built into the vector.

c. Clustering data (Agglomerative, Sequential Clustering): a distance matrix based on words distribution in documents and queries (i.e. vectors—see step 2b) is used in order to cluster words into semantic families. With reference to Tables IV an V, above, in trying to decide between the 3 pairs, whether $V_q$ goes with $V_a$ or with $V_b$, or $V_a$ goes with $V_b$, if 2 words, such as q and b appear in the same query, i.e. $Q_1$, it is more significance than if 2 words appear in the same cluster, but not in the same query. This is because 2 words in the same query is decided by the user, but 2 words in the same cluster is decided by the system when it puts 2 queries together in the same cluster. Since $V_b$ and $V_q$ have three instances in common (------), and $V_b$ and $V_a$ have two instances in common (-·-·-·-·-·), $V_b$ and $V_q$ considered to have a connection, and $V_a$ is left aside; and d. Using queries as a predesposed factor, replacing a randomization factor in clustering methods (Sequential Clustering, K-means): Some of the clustering algorithms, e.g. Sequential or K-means, have a randomized component, mainly in their initial step. InsightLook uses the structure of the queries (i.e. queries clusters) in order to control this random feature of these algorithms. The results of this are as follows—instead of starting the words-clustering-proses (i.e. connections) randomly by creating random groups of words for the initial step, the system uses the already existing groups of words created by the queries-clustering-process and only then starts the word clustering stage;

5. Using Queries and Queries Structure for Searching Information (Search Engine):

a. Methods for searching information using queries' structure (clusters): The present invention uses a hierarchy for ranking each query. Prior art search engines, such as Google™ and Yahoo!™ apply one or more equal keywords from a new query to find a document. The present invention uses several ranked levels of keywords. When using a query to retrieve documents the system first determines which is the closest query-cluster (CQC) in the DB to the new query. Only then retrieving information is applied. This sub-step involves the following steps: (i) filtering relevant documents; and (ii) ranking the filtered documents:

(i) when filtering relevant documents three optional methods can be applied in order to determined about the relevant documents:
  Pivot Only—all documents that include one of the words appeared in the new query;
  Field Union—all documents including one of the words appearing in the CQC to the new query; and
  Query Union—all documents including all of the words in one of the queries appearing in the CQC to the new query; and (ii) four types of ranking options can be applied:
  Total—every word in the CQC and the pivot has the same weight in determining the score a document can receive (a quantitative criteria);
  Wtotal—words from the CQC and the new query are weighted according to their location in the hierarchical structure mentioned in step 1a; and
  Ptotal—words from the new query have more weight when ranking a documents regardless of their hierarchical location;
  Pwtotal—words from the new query have more weight than words from the CQC. But also, the hierarchical location of the words in the new query and the CQC is taken into consideration. E.g., a document containing a word from the $6^{th}$ lever of the new query will be ranked higher than a document containing a word from the $1^{st}$ level of a query from the CQC. Nevertheless, the latter will be ranked higher than documents containing a word form the $2^{nd}$ level of a query from the CQC, etc;

b. Presenting queries' structure with respect to a new query: a user can use the clustering ranking mechanism of the system in order to view the content of the CQC. This can be used in order to: (i) monitor the distribution of the content needed; and (ii) rely on other users' word associations and notions structures; and c. Presenting submitted queries in order to facilitate the submission of a new query: The user can select an option: "Help me complete a query," and he/she presents a subject only. Herein the system returns entries based on previous queries; and 6. Using the Queries Structure to Create an Organization Map:

a. Develop a method that facilitates the bundling of experts regarding the requested data: By using step 1b, i.e. information associated with each query, the system can monitor the distribution of information in the organization. For example, by monitoring the queries submitted from users within the same department, the system can monitor the information associated with those queries, thus mapping the departments' interests with respect to the organization. Furthermore, the system detects a subject of interest associated with a specific user and assign him/her a title of expert; and b. Provide a unique graphical Organization-map of data occurrences and experts: Based on step 6a, a graphical interface is used to visualize and facilitate the monitoring of information distribution in the organization, as well as for monitoring of expert.

Reference is now made to FIG. 1, which is a screenshot illustration of a login screen, where the employee/user 110 enters his job title 120, constructed in accordance with the principles of the present invention.

Figure 2:
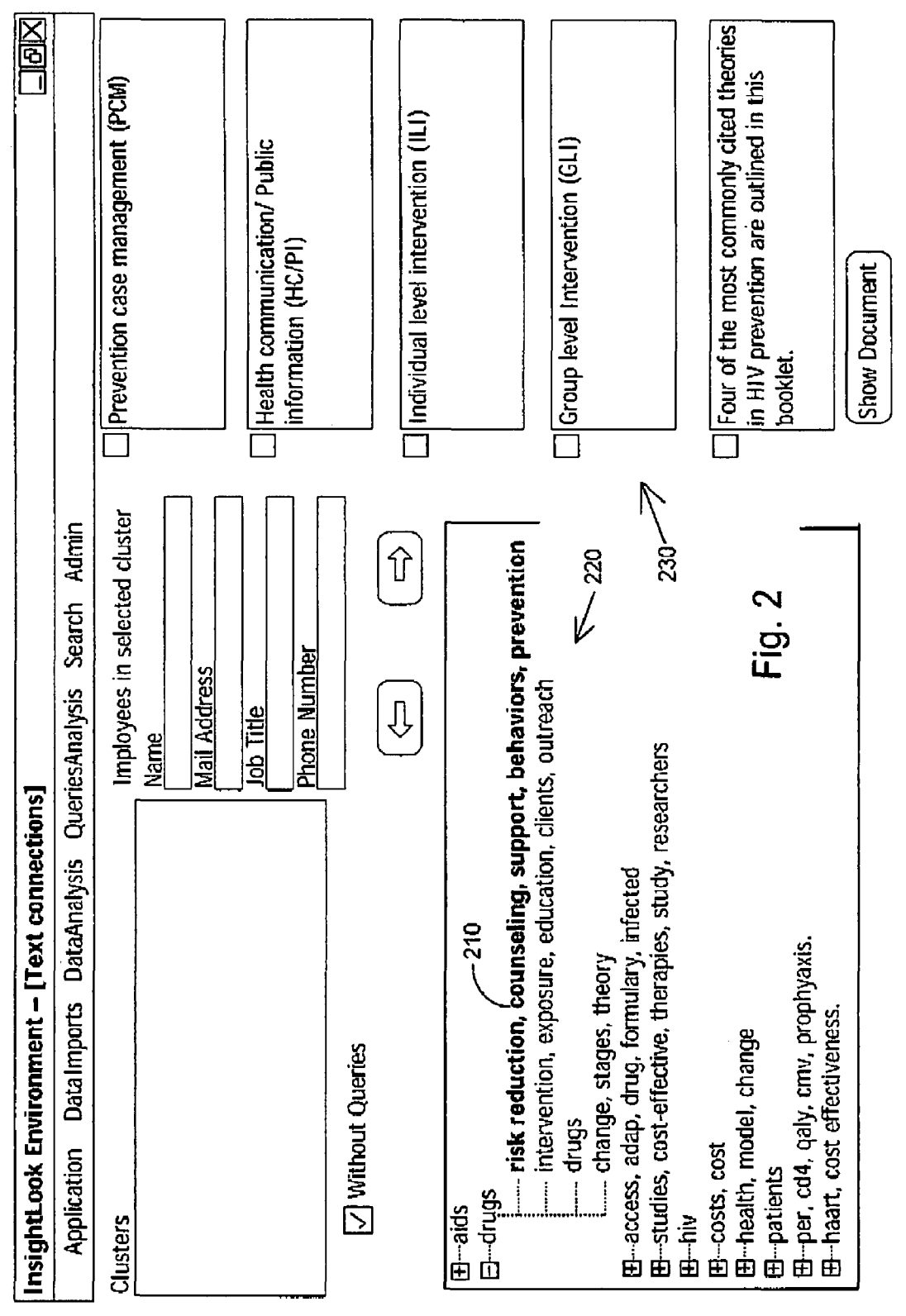

FIG. 2 is screenshot illustration of cluster specification, constructed in accordance with the principles of the present invention. The cluster category drugs 210 is shown expanded into four sub-categories 220, one of which is high-lighted for more specific retrieval of relevant documents 230.

Figure 3:
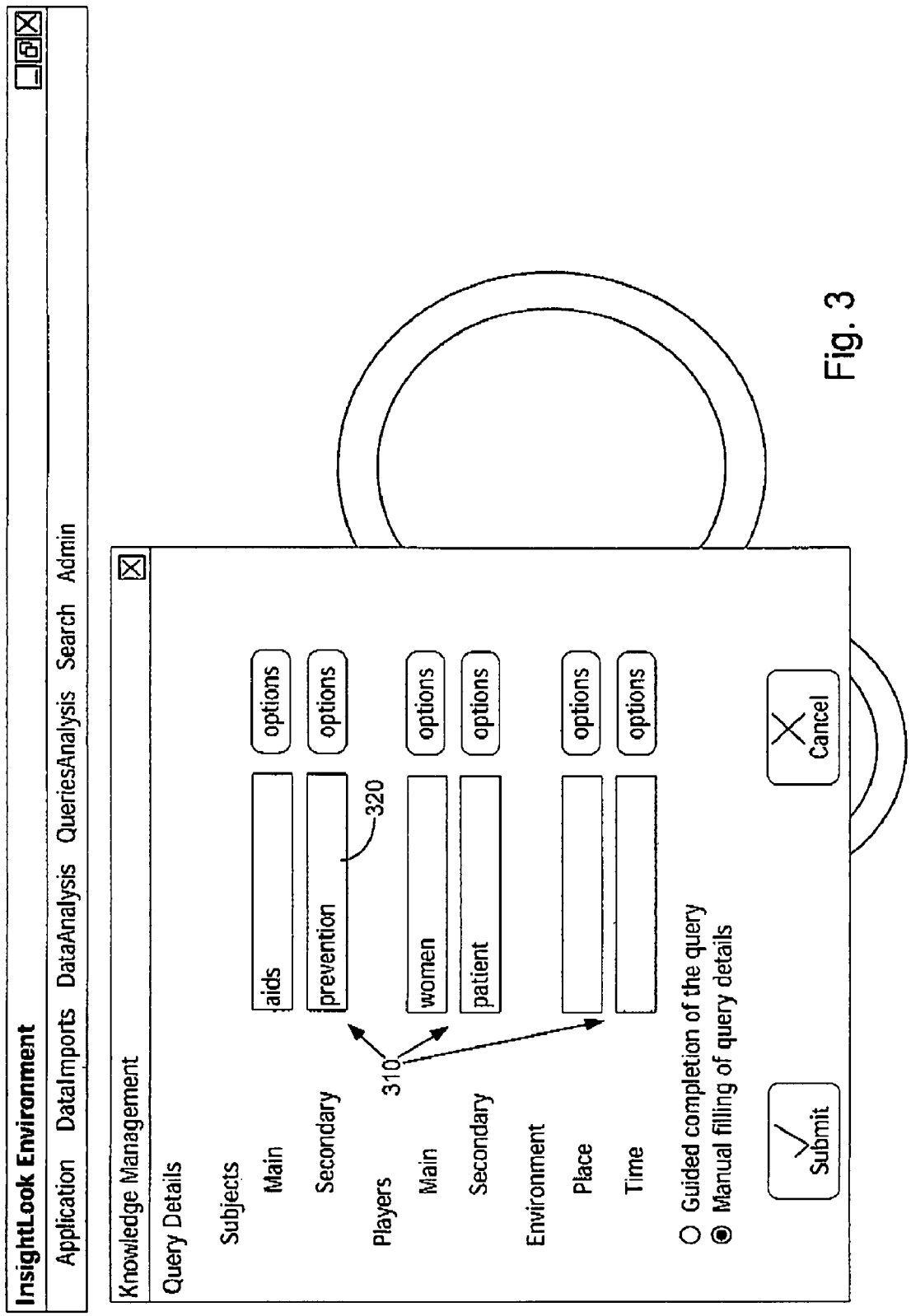
FIG. 3 is screenshot illustration of a keyword selection screen, constructed in accordance with the principles of the present invention.

FIG. 3 is screenshot illustration of a query keyword selection screen, constructed in accordance with the principles of the present invention. Six overall ranked levels of keywords having three major categories of keywords 310 are shown: subjects; players; and environment. Subjects and players are further divided into main and secondary keywords, while enviornment is sub-divided into place and time. The user has entered "aids" 320, for example, as the main keyword for subjects.

FIG. 4 is screenshot illustration of a document evaluation screen, constructed in accordance with the principles of the present invention. The titles of the documents pointed to by the query 410 of FIG. 3, according to the first three levels 420 of keywords: aids; prevention; and women are shown. The "show document" button 430 has been pressed by the user, and therefore the "document window" 440 shows the scrollable full document.

Figure 5:
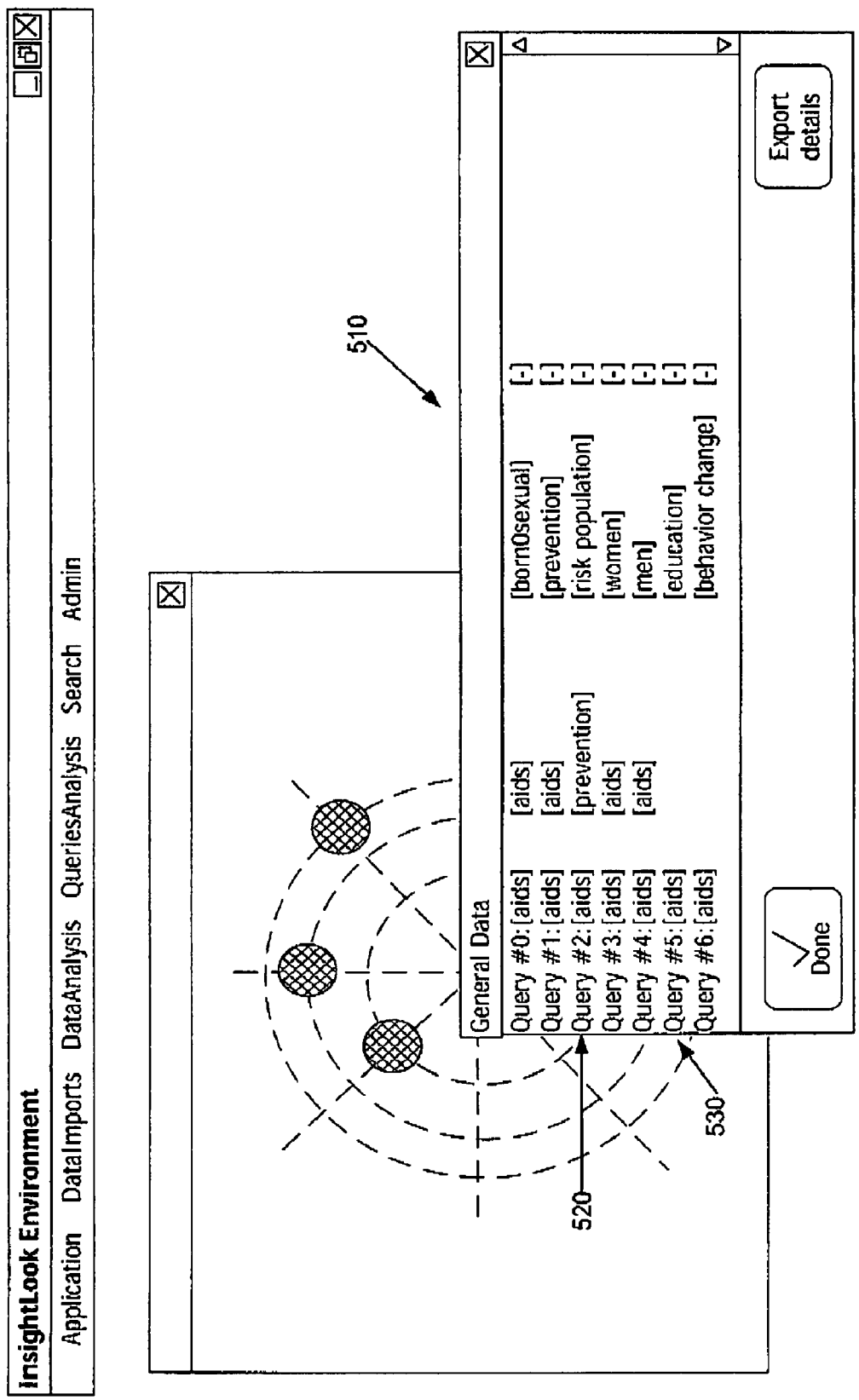
FIG. 5 is screenshot illustration of the query evaluation matrix, constructed in accordance with the principles of the present invention.

FIG. 5 is screenshot illustration of the query evaluation matrix 510, as described above, and constructed in accordance with the principles of the present invention. A new query (Query #0) 520 is evaluated against eleven existing queries 530, having similar, but variated keywords.

Figure 6:
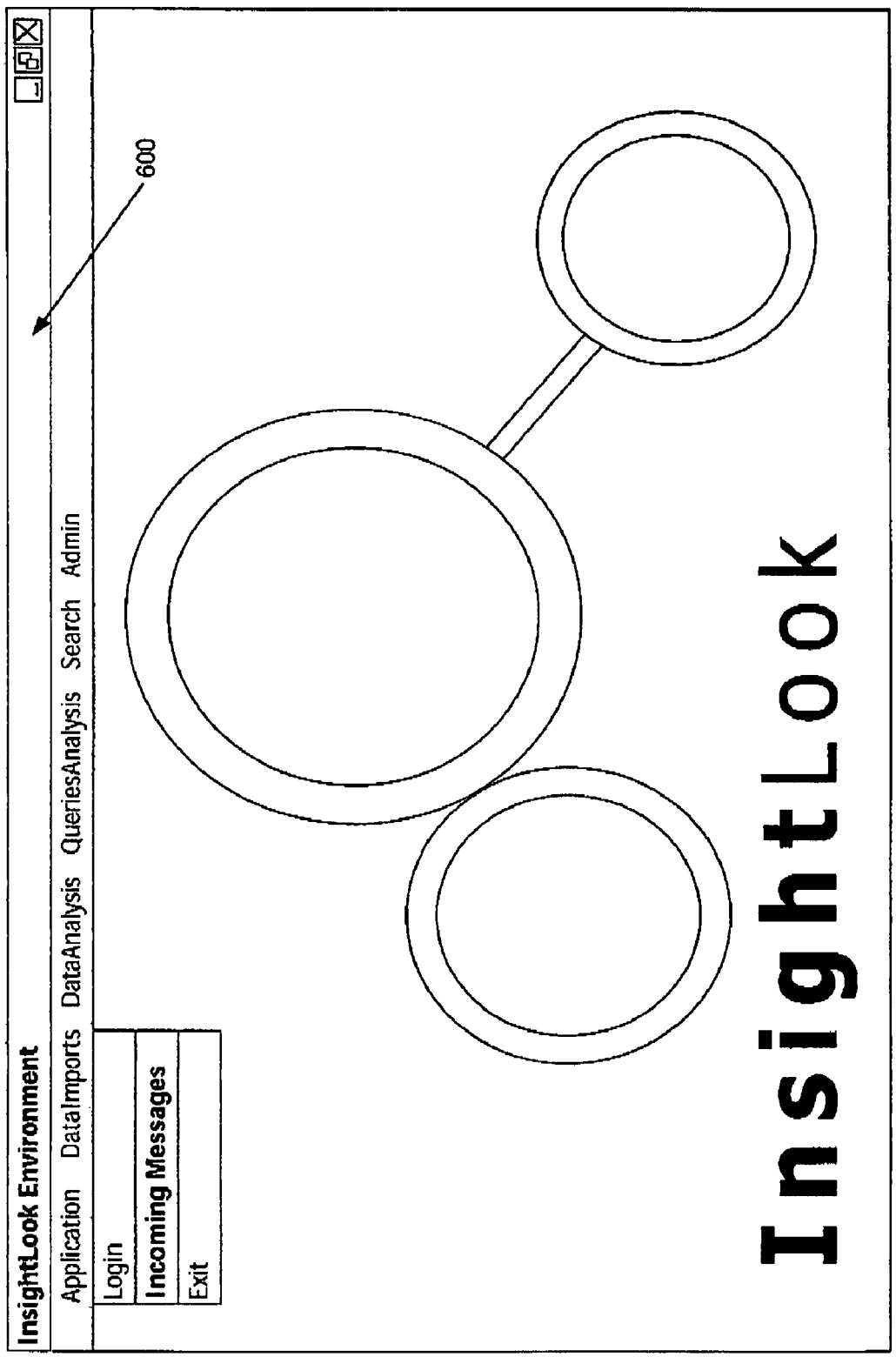
FIG. 6 is screenshot illustration of a login screen, constructed in accordance with the principles of the present invention.

FIG. 6 is screenshot illustration of a login screen 600, constructed in accordance with the principles of the present invention.

FIG. 7 is screenshot illustration of a text connections evaluation screen, constructed in accordance with the principles of the present invention. Major categories of query clusters 710 are displayed. The user has selected costs 712. The user is prompted to refresh 720.

FIG. 8 is screenshot illustration of a text connections update screen, constructed in accordance with the principles of the present invention. FIG. 8 is a "refresh" of FIG. 7. An expanded list of major categories 810 is now shown. Costs is also shown separately with a list of sub-category keywords 820, including insurance 823, which the user has high-lighted. The documents shown 830 now include sub-category keywords high-lighted 835. Again, the user is prompted to refresh 840.

FIG. 9 is screenshot illustration of a text connections interactive screen, constructed in accordance with the principles of the present invention. FIG. 9 is a "refresh" of FIG. 8. The sub-category "cost, insurance" 910 is now shown expanded, including "hiv" 914. Since the user has interactively high-lighted "hiv" 914, document having occurances of hiv and cost are displayed, with these terms high-lighted 920.

I claim:

1. A computer implemented method to create a structure from a knowledge base of an organization, the knowledge base being part of a system comprising a document database (DB) and queries submitted by users concerning the documents, wherein the method performs definitive and decisive matching and grouping the queries into clusters to enable analysis of the knowledge base of the organization; the method comprising: submitting by the users in the organization of queries having weighted characteristics; recording the details of the submitter comprising at least: job title; department name; and employee contact references comprising at least email address and level of security authorization; comparing queries using a weight matrix generated by a distance function; clustering of the queries into a semantic structure based on said weight matrix, by grouping said queries into a 'prioritized structure' based on the comparison of a location of a word in said query to the location of the same word in another query; and rating of a new query relative to the nearest of said clusters, wherein said new queries are evaluated in one of real-time and periodically, to determine whether to one of: add said query to an existing cluster; and form a separate "satellite" cluster.

2. The method according to claim 1, further comprising: periodically updating the gathering of data of said newly submitted queries and resulting documents into a sum total of data elements for the organization; entering said sum total in the organization DB without prior categorization of said sum total by subject matter; instantly performing a matching procedure of assembling queries and documents keywords into clusters; categorizing said newly submitted queries according to a continuously updated list of categories; and repeatedly redefining categories and clusters according to new queries and documents.

3. The method according to claim 2, comprising the steps of: gathering data into the organization DB; generating a vector structure of the data; and using the vector structure in order to form semantic familiarities (clustering words, i.e., "connections").

4. The method according to claim 2, further comprising enhancing the queries for later pre-processing of the data, in order to best exploit the latter element of the method.

5. The method according to claim 4, wherein enhancing comprises: enhancing words appearing in queries by multiplying the number of appearances with a constant; comparing the distribution of a word within the organization DB and distribution of said word in Common Language (CL); and weighting words appearances in the DB and the queries relative to appearances in the (CL).

6. The method according to claim 4, further comprising clustering the data.

7. The method according to claim 6, wherein clustering the data comprises: using information theories in order to assemble and represent the data; using queries as prior knowledge for the algorithms processing the data; clustering data (agglomerative, sequential clustering); and using queries as a predisposed factor, thereby replacing the random factor when performing clustering.

8. The method according to claim 6, further comprising using queries' data for searching information (implementing a search engine).

9. The method according to claim 8, comprising the steps of: searching information using the queries' structure (clusters); presenting queries' structure with respect to a new query (when a user presents a new query, the system rates the nearest clusters according to the new query); and presenting submitted queries in order to facilitate the submission of a new query.

10. The method according to claim 8, further comprising using the queries structure to create an organization map.

11. The method according to claim 1, wherein using the queries structure to create an organization map comprises: developing a method that facilitates the designation of experts concerning the requested data; and providing a graphical organization map of the data occurrences and the experts.

* * * * *